(12) United States Patent
Sengupta et al.

(10) Patent No.: US 12,369,130 B2
(45) Date of Patent: Jul. 22, 2025

(54) USER EQUIPMENT TIMING MISALIGNMENT REPORTING IN NON-TERRESTRIAL NETWORKS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Le Liu, Fremont, CA (US); Bharat Shrestha, San Diego, CA (US); Liangping Ma, San Diego, CA (US); Peter Gaal, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/303,801

(22) Filed: Jun. 8, 2021

(65) Prior Publication Data

US 2022/0039033 A1 Feb. 3, 2022

Related U.S. Application Data

(60) Provisional application No. 62/706,060, filed on Jul. 29, 2020.

(51) Int. Cl.
*H04W 72/23* (2023.01)
*H04W 56/00* (2009.01)
(Continued)

(52) U.S. Cl.
CPC ....... *H04W 56/001* (2013.01); *H04W 56/006* (2013.01); *H04W 72/0446* (2013.01);
(Continued)

(58) Field of Classification Search
CPC ............ H04W 56/001; H04W 56/006; H04W 72/042; H04W 72/0446; H04W 74/0833; H04W 84/06
See application file for complete search history.

(56) References Cited

U.S. PATENT DOCUMENTS 10,111,188 B2 10/2018 Feng et al.
2010/0130225 A1 5/2010 Alles et al.
(Continued)

FOREIGN PATENT DOCUMENTS

JP 2013545329 A 12/2013
WO WO-2014027942 A1 2/2014
(Continued)

OTHER PUBLICATIONS

International Search Report and Written Opinion—PCT/US2021/070680—ISA/EPO—Oct. 18, 2021.
(Continued)

*Primary Examiner* — Siren Wei
(74) *Attorney, Agent, or Firm* — Harrity & Harrity, LLP

(57) ABSTRACT

Various aspects of the present disclosure generally relate to wireless communication. In some aspects, a user equipment (UE) may determine timing misalignment information for a timing misalignment between an uplink timeline and a downlink timeline associated with a non-terrestrial cell. The UE may transmit the timing misalignment information to a satellite associated with the non-terrestrial cell. Numerous other aspects are described.

30 Claims, 10 Drawing Sheets

(51) Int. Cl.
*H04W 72/0446* (2023.01)
*H04W 74/0833* (2024.01)
*H04W 84/06* (2009.01)

(52) U.S. Cl.
CPC ....... *H04W 72/23* (2023.01); *H04W 74/0833* (2013.01); *H04W 84/06* (2013.01)

(56) References Cited

U.S. PATENT DOCUMENTS

| | | | |
|---|---|---|---|
| 2015/0036666 A1* | 2/2015 | Blankenship | H04W 56/0005 370/336 |
| 2016/0112181 A1 | 4/2016 | Tabet et al. | |
| 2018/0160440 A1 | 6/2018 | Hosseini et al. | |
| 2018/0176959 A1 | 6/2018 | Dinan | |
| 2018/0242268 A1* | 8/2018 | Rune | H04W 36/08 |
| 2018/0263060 A1* | 9/2018 | Tirronen | H04W 72/23 |
| 2018/0352582 A1 | 12/2018 | Yi et al. | |
| 2019/0159155 A1 | 5/2019 | Abedini et al. | |
| 2019/0306886 A1* | 10/2019 | Choi | H04W 74/0891 |
| 2019/0320467 A1* | 10/2019 | Freda | H04W 74/004 |
| 2021/0029658 A1* | 1/2021 | Mahalingam | H04W 56/0005 |
| 2021/0029737 A1* | 1/2021 | Pan | H04W 74/002 |
| 2021/0185653 A1* | 6/2021 | Uchino | H04W 48/16 |
| 2021/0274526 A1* | 9/2021 | Shin | H04L 1/1896 |
| 2021/0321464 A1* | 10/2021 | Lin | H04B 7/1851 |
| 2022/0256610 A1* | 8/2022 | Lin | H04W 74/0833 |

FOREIGN PATENT DOCUMENTS

| | | |
|---|---|---|
| WO | WO-2019195457 A1 | 10/2019 |
| WO | 2020031155 A1 | 2/2020 |

OTHER PUBLICATIONS

OPPO: "Discussion on Timing Advance in NTN RACH", 3GPP TSG-RAN WG2 Meeting #107, R2-1909753, Prague, Czech, Aug. 26, 2019-Aug. 30, 2019, pp. 1-3, Aug. 16, 2019, 4 Pages.

* cited by examiner

Satellite 110

Uplink 512: | 0 | 1 | 2 | 3 | 4 | 5 | 6 | 7 | 8 | 9 | 11 | 12 | 13 | 14 | 15 | 16 |

Downlink 514: | 0 | 1 | 2 | 3 | 4 | 5 | 6 | 7 | 8 | 9 | 11 | 12 | 13 | 14 | 15 | 16 |

UE 120-1 (Far from Satellite 110)

Uplink 522: | 0 | ... | N-3 | N-2 | N-1 | N | N+1 | N+2 | N+3 | N+4 | N+5 | N+6 | N+7 | N+8 | N+9 |

Uplink Transmission 528

Downlink 524: | -1 | 0 | 1 | 2 | 3 | 4 | 5 | 6 | 7 | 8 | 9 | 11 |

Timing Misalignment 526 — Unusable

UE 120-2 (Near to Satellite 110)

Uplink 532: | 0 | ... | N-3-D | N-2-D | N-1-D | N-D | N+1-D | N+2-D | N+3-D | N+4-D | N+5-D | N+6-D | N+7-D | N+8-D | N+9-D |

Uplink Transmission 538

Downlink 534: | 0 | 1 | 2 | 3 | 4 | 5 | 6 | 7 | 8 | 9 |

Timing Misalignment 536 — Unusable

FIG. 5

USER EQUIPMENT TIMING MISALIGNMENT REPORTING IN NON-TERRESTRIAL NETWORKS

CROSS-REFERENCE TO RELATED APPLICATION

This Patent Application claims priority to U.S. Provisional Patent Application No. 62/706,060, filed on Jul. 29, 2020, entitled "USER EQUIPMENT TIMING MISALIGNMENT REPORTING IN NON-TERRESTRIAL NETWORKS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment (UE) timing misalignment reporting in non-terrestrial networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining timing misalignment information for a timing misalignment between an uplink timeline and a downlink timeline of the UE associated with a non-terrestrial cell, and transmitting the timing misalignment information to a satellite associated with the non-terrestrial cell.

In some aspects, a method of wireless communication performed by a UE includes receiving an indication to transmit an uncompensated uplink signal to a satellite associated with a non-terrestrial cell, and transmitting the uncompensated uplink signal to the satellite based at least in part on receiving the indication, wherein the uncompensated uplink signal is not adjusted based at least in part on a timing misalignment between an uplink timeline and a downlink timeline associated with the non-terrestrial cell.

In some aspects, a UE for wireless communication includes a memory and one or more processors coupled to the memory, the memory and the one or more processors configured to determine timing misalignment information for a timing misalignment between an uplink timeline and a downlink timeline associated with a non-terrestrial cell, and transmit the timing misalignment information to a satellite associated with the non-terrestrial cell.

In some aspects, a UE for wireless communication includes a memory and one or more processors coupled to the memory, the memory and the one or more processors configured to receive an indication to transmit an uncompensated uplink signal to a satellite associated with a non-terrestrial cell, and transmit the uncompensated uplink signal to the satellite based at least in part on receiving the indication, wherein the uncompensated uplink signal is not adjusted based at least in part on a timing misalignment between an uplink timeline and a downlink timeline associated with the non-terrestrial cell.

In some aspects, a non-transitory computer-readable medium storing a set of instructions for wireless communication includes one or more instructions that, when executed by one or more processors of a UE, cause the UE to determine timing misalignment information for a timing misalignment between an uplink timeline and a downlink timeline associated with a non-terrestrial cell, and transmit the timing misalignment information to a satellite associated with the non-terrestrial cell.

In some aspects, a non-transitory computer-readable medium storing a set of instructions for wireless communication includes one or more instructions that, when executed by one or more processors of an UE, cause the UE to receive an indication to transmit an uncompensated uplink signal to a satellite associated with a non-terrestrial cell, and transmit the uncompensated uplink signal to the satellite based at least in part on receiving the indication, wherein the uncompensated uplink signal is not adjusted based at least in part on a timing misalignment between an uplink timeline and a downlink timeline associated with the non-terrestrial cell.

In some aspects, an apparatus for wireless communication includes means for determining timing misalignment information for a timing misalignment between an uplink timeline and a downlink timeline associated with a non-terrestrial cell, and means for transmitting the timing misalignment information to a satellite associated with the non-terrestrial cell.

In some aspects, an apparatus for wireless communication includes means for receiving an indication to transmit an uncompensated uplink signal to a satellite associated with a non-terrestrial cell, and means for transmitting the uncompensated uplink signal to the satellite based at least in part on receiving the indication, wherein the uncompensated uplink signal is not adjusted based at least in part on a timing misalignment between an uplink timeline and a downlink timeline associated with the non-terrestrial cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of timing alignment in a non-terrestrial network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
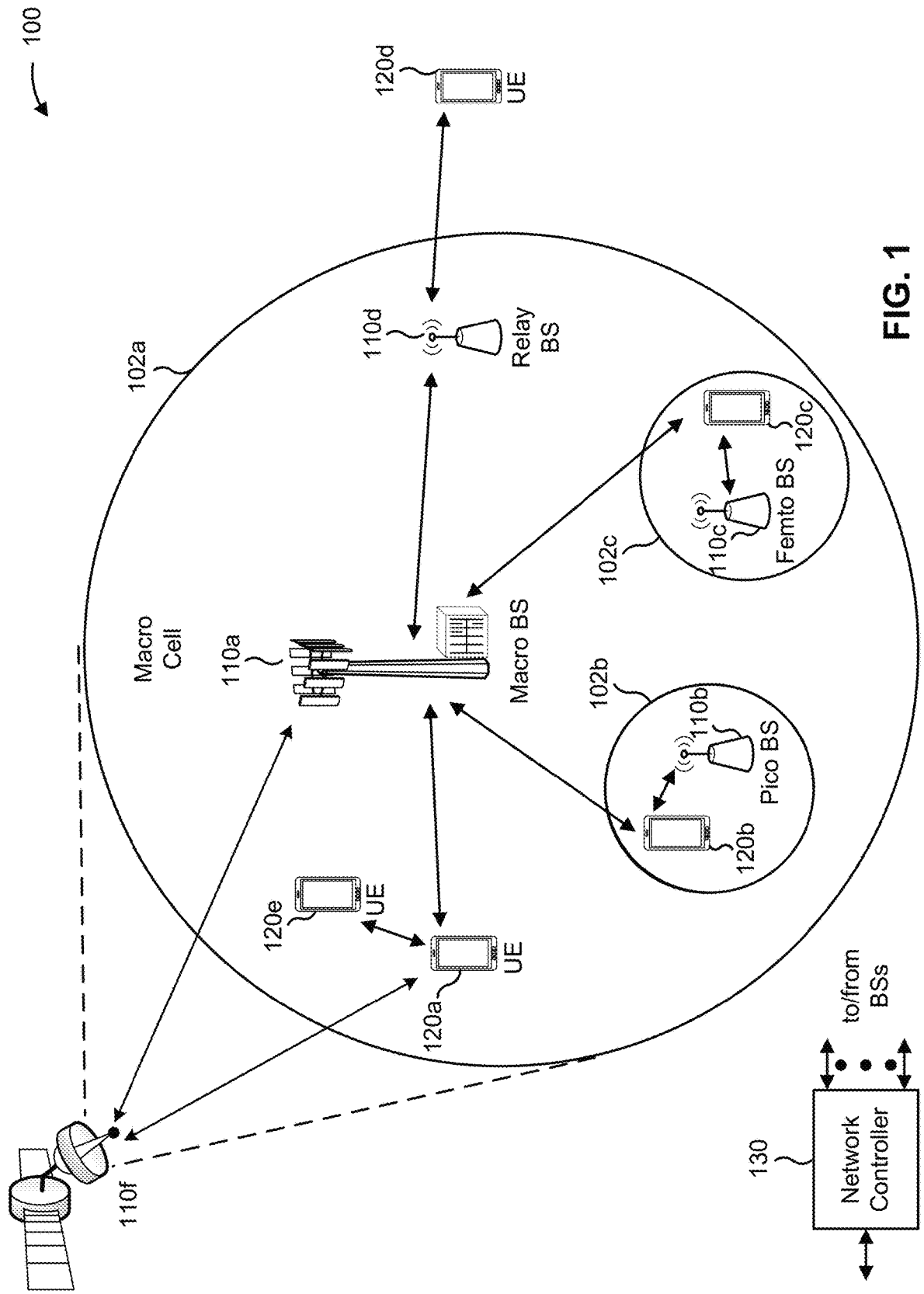
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the wireless network 100 may include one or more non-terrestrial network (NTN) deployments in which a non-terrestrial wireless communication device may include a BS 110f (referred to herein, interchangeably, as a "non-terrestrial BS," "non-terrestrial base station," "satellite base station," or "satellite"), a relay station (referred to herein, interchangeably, as a "non-terrestrial relay station" or "satellite relay station"), and/or the like. As used herein, "NTN" may refer to a network for which access is facilitated by a non-terrestrial BS 110f, a non-terrestrial relay station, and/or the like. A satellite may provide a non-terrestrial cell, which may at least partially overlap with one or more cells provided by ground-based BSs, may encompass one or more cells provided by ground-based BSs, and/or the like. In some aspects, a satellite may be associated with a non-terrestrial BS (e.g., the BS may be mounted on the satellite). In some aspects, a satellite may be associated with a terrestrial or ground-based BS.

The wireless network 100 may include any number of non-terrestrial wireless communication devices. A non-terrestrial wireless communication device may include a satellite, a high-altitude platform (HAP), and/or the like. A HAP may include a balloon, a dirigible, an airplane, an unmanned aerial vehicle, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, one or more components and/or devices included in a core network of wireless network 100, and/or the like.

As indicated above, FIG. 1 is provided as an example. Other examples may differ from what is described with regard to FIG. 1.

Figure 2:
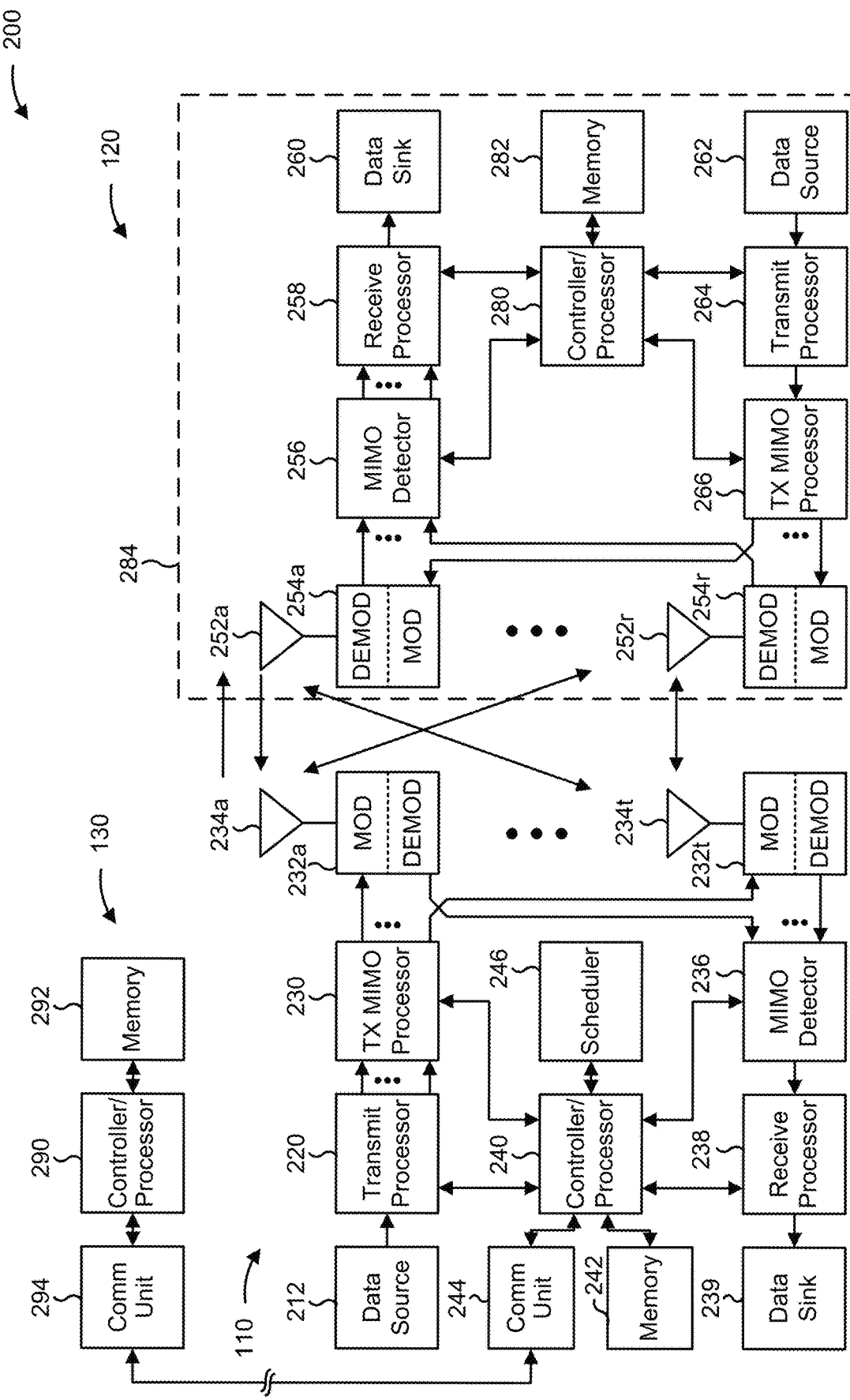
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-9).

Controller/processor 240 of base station 110, controller/processor 280 of UE 120, and/or any other component(s) of FIG. 2 may perform one or more techniques associated with UE timing misalignment reporting in non-terrestrial networks, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes described herein. In some aspects, executing instructions may include running the instructions, converting the instructions, compiling the instructions, and/or interpreting the instructions, among other examples.

In some aspects, UE 120 may include means for determining timing misalignment information for a timing misalignment between an uplink timeline and a downlink timeline associated with a non-terrestrial cell, means for transmitting the timing misalignment information to a satellite 110f associated with the non-terrestrial cell, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
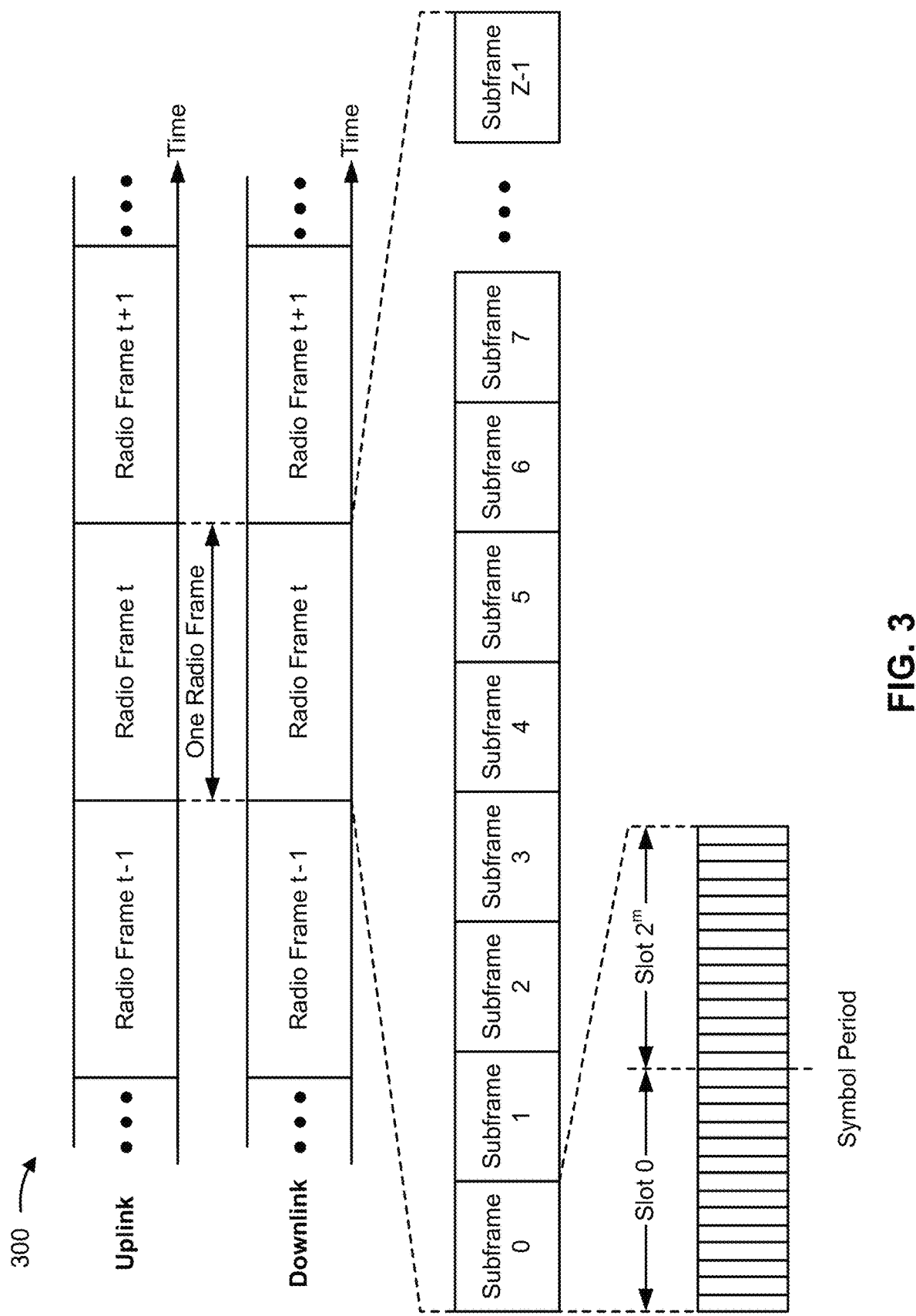
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
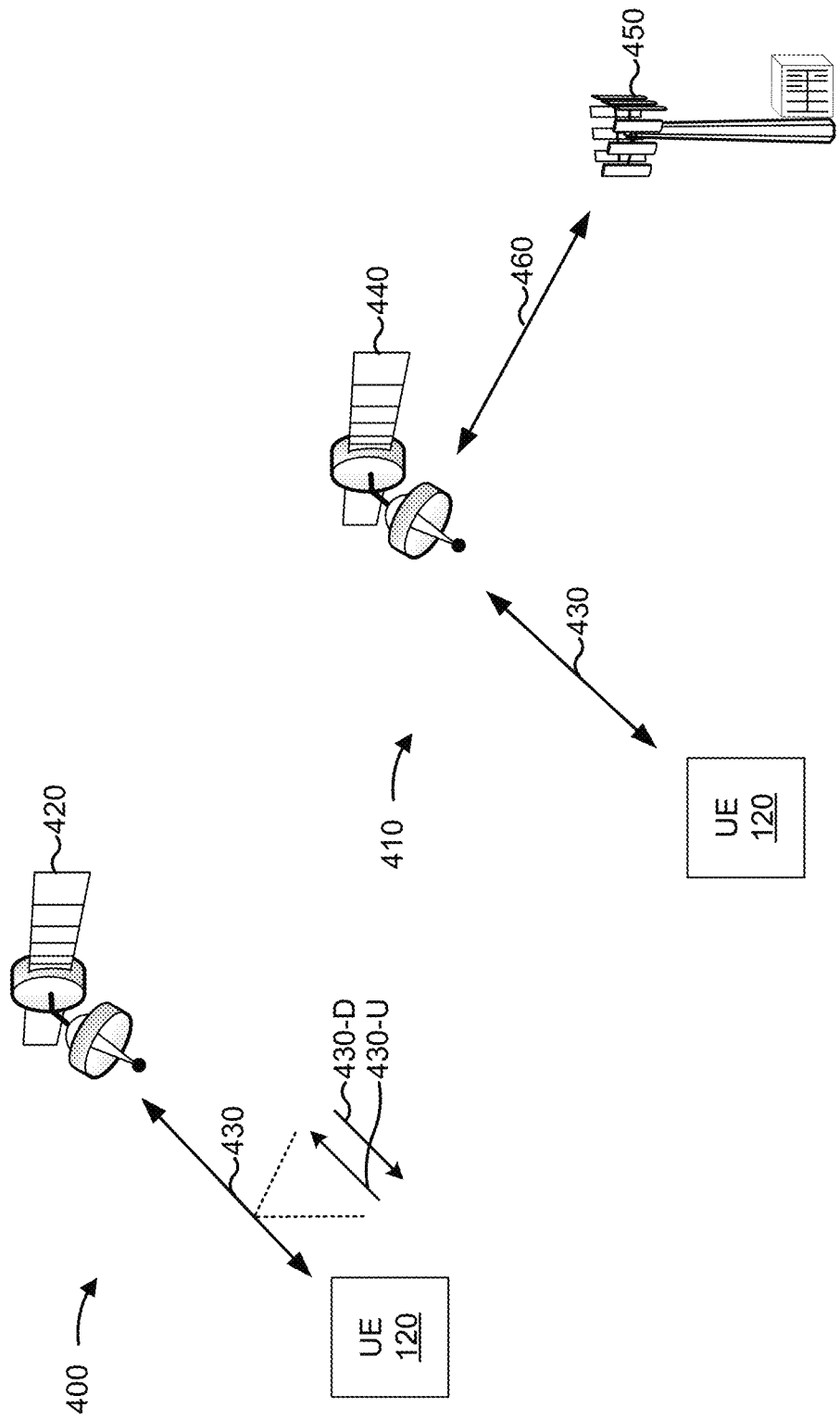
FIG. 4 is a diagram illustrating an example of a regenerative satellite deployment and an example of a transparent satellite deployment in a non-terrestrial network.

FIG. 4 is a diagram illustrating an example 400 of a regenerative satellite deployment and an example 410 of a transparent satellite deployment in a non-terrestrial network, in accordance with the present disclosure.

Example 400 shows a regenerative satellite deployment. In example 400, a UE 120 is served by a satellite 420 via a service link 430. For example, the satellite 420 may include a satellite 110f. In some aspects, the satellite 420 may be referred to as a non-terrestrial base station, a regenerative repeater, an on-board processing repeater, and/or the like. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 (e.g., a ground-based BS 110) via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability, a Global Positioning System (GPS) capability, and/or the like, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U and a downlink of the service link 430 may be indicated by reference number 430-D. Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

As indicated above, FIG. 4 is provided as an example. Other examples may differ from what is described with regard to FIG. 4.

FIG. 5 is a diagram illustrating an example 500 of timing alignment in a non-terrestrial network, in accordance with the present disclosure. As shown in FIG. 5, a satellite 110 may be timing aligned with one or more UEs 120 (e.g., UE 120-1, UE 120-2, and/or the like) served in a non-terrestrial cell of the satellite 110.

As further shown in FIG. 5, the satellite 110 may be associated with an uplink timeline 512 that includes a plurality of time domain resources (e.g., slots or subframes 0-16) for uplink communication in the non-terrestrial cell, and may be associated with a downlink timeline 514 that includes a plurality of time domain resources (e.g., slots or subframes 0-16) for downlink communication in the non-terrestrial cell. From the perspective of the satellite 110, the uplink timeline 512 and the downlink timeline 514 may be timing aligned (e.g., slot or subframe 0 of the uplink timeline 512 is timing aligned with slot or subframe 0 of the downlink timeline 514, and so on).

Due to the distance between the UE 120-1 and the satellite BS 110, and the distance between the UE 120-2 and the satellite 110, a propagation delay occurs for communications between the UE 120-1 and the satellite 110, and for communications between the UE 120-2 and the satellite 110. As a result, from the perspective of the UE 120-1, an uplink timeline 522 and a downlink timeline 524 for the UE 120-1 are misaligned. The UE 120-1 may determine a timing misalignment 526 between the uplink timeline 522 and the downlink timeline 524. The timing misalignment 526 may include an offset of N slots or subframes (or another quantity of time-domain resources, or another time duration, and/or the like) between a slot or subframe 0 of the uplink timeline 522 and slot or subframe 0 of the downlink timeline 524. In particular, the uplink timeline 522 may be shifted or adjusted earlier in time by N slots or subframes, such that the UE 120-1 starts an uplink transmission 528 early to compensate for the propagation delay between the UE 120-1 and the satellite 110. If the UE 120-1 is a half-duplex UE (or another type of UE that is unable to perform simultaneous transmission and reception), the slots or subframes used for the uplink transmission 528 may be unusable for downlink reception for the UE 120-1. Moreover, slots, subframes or other time-domain resources on both sides of the slots or subframes used for the uplink transmission 528 may not be usable to provide guard periods for the UE 120-1 to transition between transmission and reception.

As further shown in FIG. 5, the UE 120-2 may be located closer to the satellite 110 relative to UE 120-1. Accordingly, the adjustment between the uplink timeline 532 and the downlink timeline 534 for the UE 120-2 may be relatively less than that for the UE 120-1 because of less propagation delay. In these cases, the UE 120-2 may determine a timing misalignment 536 for compensating for the propagation delay to include N−D slots or subframes, where D is based at least in part on the distance between the UE 120-2 and the satellite 110. In particular, the uplink timeline 532 may be shifted or adjusted earlier in time by N minus D (N−D) slots or subframes such that the UE 120-2 starts an uplink transmission 538 early to compensate for the propagation delay between the UE 120-2 and the satellite 110. In some cases, for a particular value of D (e.g., where D=5), the same uplink subframe/slot index (N) may result in different unusable downlink subframe/slot indices at UE 120-1 and 120-2.

As indicated above, FIG. 5 is provided as an example. Other examples may differ from what is described with regard to FIG. 5.

As described above, a UE in a non-terrestrial network may determine a timing misalignment between an uplink timeline and a downlink timeline for the UE associated with a satellite. However, the satellite may be unaware of the timing misalignment (e.g., due to at least some component of this misalignment being estimated by the UE, for example, based on its geolocation information, or satellite ephemeris information, or any combination thereof), which may result in the satellite scheduling overlapping uplink and downlink communications with the UE. These overlapping communications may be referred to as collisions (e.g., collisions between uplink transmission for the UE and downlink reception for the UE) in cases where the UE is unable to process (or incapable of processing) simultaneous transmissions (such as if the UE is a half-duplex UE). These collisions may result in one or more downlink communications being dropped or non-receivable at the UE, may result in delays in uplink communications being transmitted to the satellite, may increase retransmissions between the UE and the satellite, and/or the like.

Some aspects described herein provide techniques and apparatuses for UE timing misalignment reporting in non-terrestrial networks. In some aspects, the UE (e.g., a UE 120) may determine timing misalignment information for a timing misalignment between an uplink timeline and a downlink timeline for a non-terrestrial cell associated with a satellite (e.g., a satellite 110, a satellite 420, and/or the like). The UE may transmit the timing misalignment information to the satellite, which enables the satellite to schedule and/or configure communications between the UE and the satellite accordingly. In this way, the satellite may schedule and/or configure communications between the UE and the satellite in a manner that reduces and/or prevents collisions between uplink transmission and downlink reception for the UE. This may decrease the quantity of downlink communications being dropped or non-receivable at the UE, may decrease delays in uplink communications being transmitted to the satellite, may decrease retransmissions between the UE and the satellite, and/or the like. Techniques and apparatuses described herein may be used in NB-IoT communications, enhanced mobile broadband (eMBB) communications, and/or other types of communications.

Figure 6:
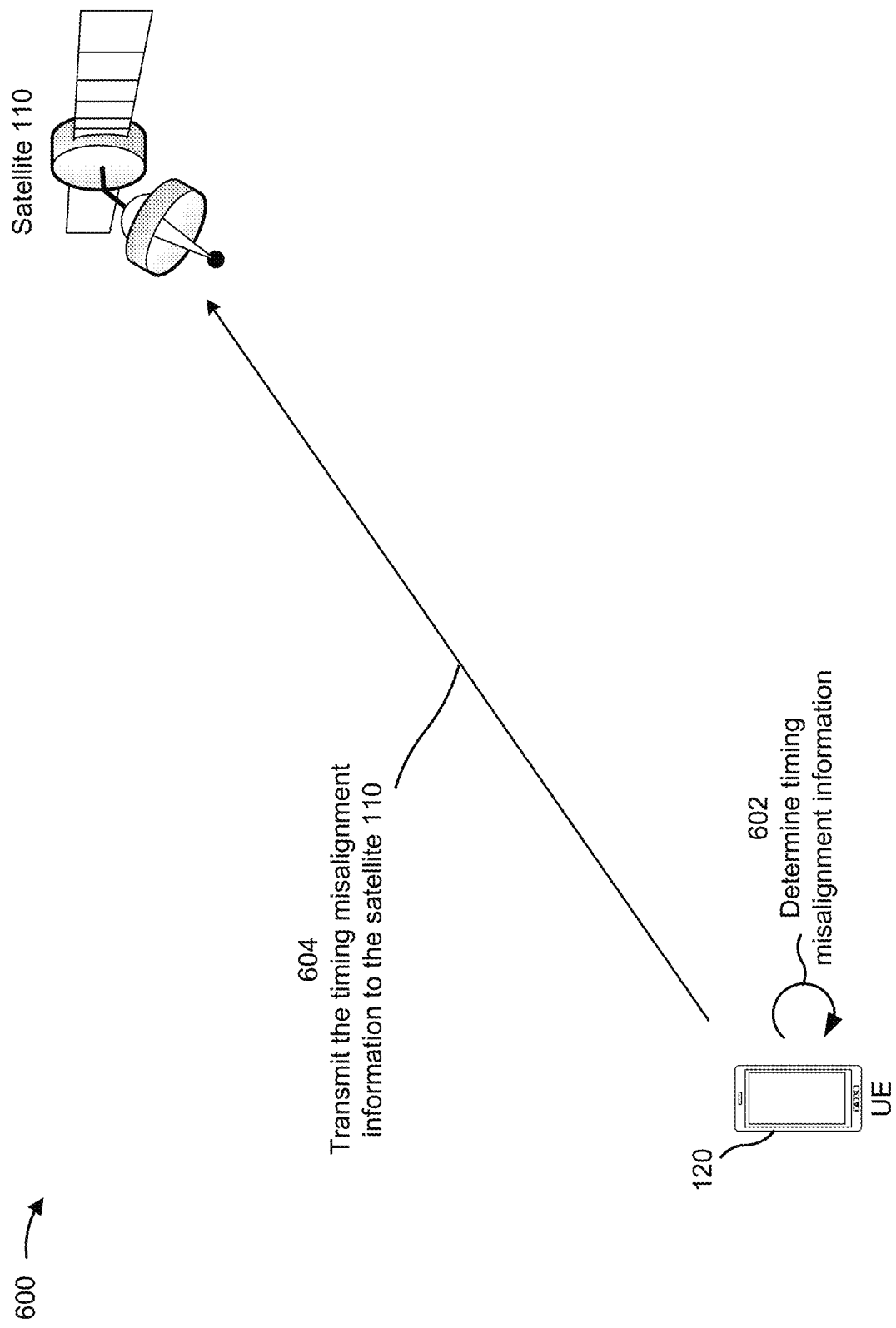
FIGS. 6 and 7 are diagrams illustrating examples associated with UE timing misalignment reporting in non-terrestrial networks, in accordance with the present disclosure.

FIG. 6 is a diagram illustrating an example 600 associated with UE timing misalignment reporting in non-terrestrial networks, in accordance with the present disclosure. As shown in FIG. 6, example 600 may include communication between a UE 120 and a satellite 110 (e.g., a satellite 420). In some aspects, the UE 120 and the satellite 110 may be included in a wireless network, such as wireless network 100. In some aspects, the UE 120 and the satellite 110 may communicate on a wireless access link or a service link 430, which may include an uplink 430-U and a downlink 430-D.

In some aspects, UE 120 may be served by a non-terrestrial cell associated with and/or provided by the satellite 110. In some aspects, the UE 120 and the BS 110 may communicate based at least in part on an uplink timeline (e.g., uplink time 512, uplink timeline 522, uplink timeline 532, and/or the like) and a downlink timeline (e.g., downlink timeline 514, downlink timeline 524, downlink timeline 534, and/or the like).

As shown in FIG. 6, and by reference number 602, the UE 120 may determine (e.g., using receive processor 258, transmit processor 264, controller/processor 280, memory 282, determination component 1008 of FIG. 10 (described below), and/or the like) timing misalignment information for a timing misalignment (e.g., timing misalignment 526, timing misalignment 536, and/or the like) between the uplink timeline and the downlink timeline for the non-terrestrial cell. In some aspects, the UE 120 may determine the timing misalignment information based at least in part on a geolocation of the UE 120. The UE 120 may determine the geolocation based at least in part on a triangulation technique, based at least in part on GPS or GNSS satellite positioning information, and/or the like.

The timing misalignment information may include various types of information associated with the timing misalignment. For example, the timing misalignment information may include an indication of the geolocation of the UE 120. As another example, the timing misalignment information may include an indication of the timing misalignment. As indicated above, the timing misalignment determined by the UE 120 may be a relatively large timing misalignment that is greater than a timing advance that can be detected and communicated to the UE 120 by the satellite 110 as part of a random access procedure.

The timing misalignment may be indicated as an offset between the uplink timeline and the downlink timeline for the non-terrestrial cell associated with the satellite 110. In some aspects, the UE 120 may explicitly indicate the actual estimated or determined magnitude of the offset. For example, the UE 120 may explicitly indicate the estimated or determined magnitude of the offset as an amount of time between the uplink timeline and the downlink timeline (e.g., in milliseconds, seconds, and/or the like), as a quantity of one or more types of time-domain resources between the uplink timeline and the downlink timeline (e.g., a quantity of slots, a quantity of subframes, a quantity of radio frames, and/or the like between the uplink timeline and the downlink timeline), and/or the like.

In some aspects, the UE 120 may indicate a range in which the offset is included. For example, the UE 120 may indicate a time duration range, from a plurality of time duration ranges (e.g., time duration ranges incremented by a particular amount of time), in which the time duration of the offset is included. As another example, the UE 120 may indicate a time-domain resource range (e.g., a range of a quantity of slots, a range of a quantity of subframes, and/or the like), from a plurality of time-domain resource ranges, in which the quantity of time-domain resources of the offset is included.

Figure 10:
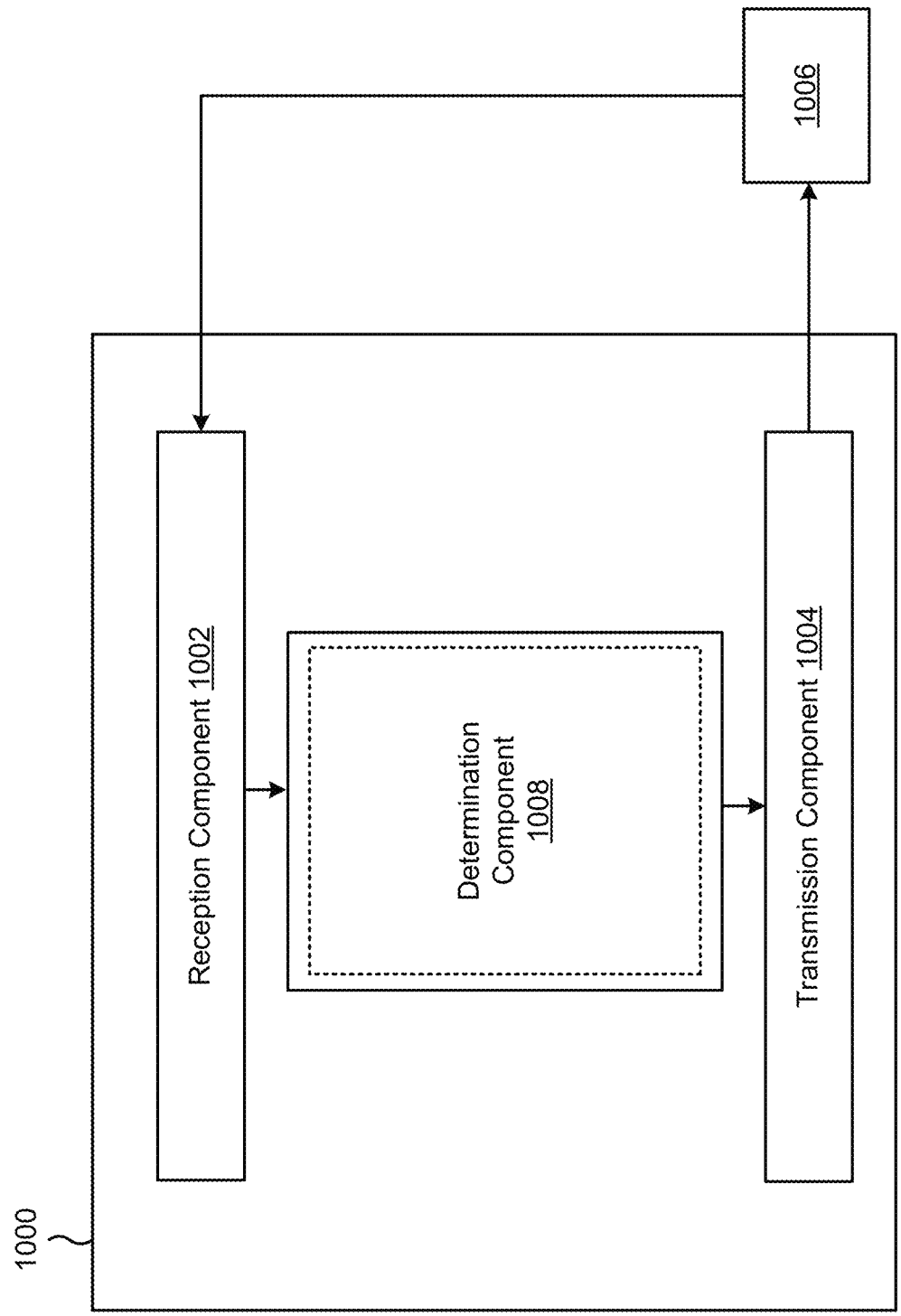
FIG. 10 is a block diagram of an example apparatus for wireless communication, in accordance with the present disclosure.

As further shown in FIG. 6, and by reference number 604, the UE 120 may transmit (e.g., using antenna 252, transmit processor 264, TX MIMO processor 266, MOD 254, controller/processor 280, memory 282, transmission component 1004 of FIG. 10, and/or the like) the timing misalignment information to the satellite 110. The UE 120 may transmit the timing misalignment information in one or more types of uplink communications, such as an uplink control information (UCI) communication, a medium access control control element (MAC-CE) communication, a radio resource control (RRC) communication, or another type of uplink communication.

The UE 120 may transmit the timing alignment information at various times and based at least in part on various triggers or events. For example, the UE 120 may transmit the timing alignment information based at least in part on receiving (e.g., using antenna 252, DEMOD 254, MIMO detector 256, receive processor 258, controller/processor 280, memory 282, reception component 1002 of FIG. 10, and/or the like), from the satellite 110, an indication to transmit the timing misalignment information. The indication may be included in a downlink control information (DCI) communication, a MAC-CE communication, an RRC communication, a physical downlink control channel (PDCCH) communication, or another type of downlink communication.

As another example, the UE 120 may transmit the timing misalignment information on a periodic or semi-persistent uplink grant (e.g., received from the satellite 110). In these cases, the UE 120 may transmit the timing misalignment information in uplink resources (e.g., slots, symbols, subframes, resource blocks, subcarriers, and/or the like) scheduled, allocated, and/or configured for the UE 120 in the periodic or semi-persistent uplink grant.

As another example, the UE 120 may transmit the timing misalignment information based at least in part on detecting, determining, and/or identifying an event. The event may include, for example, an event defined or identified in a wireless communication standard or a wireless communication specification, an event included in a table or another type of data structure, an event associated with an amount of change between the latest timing misalignment and a previously determined timing misalignment (e.g., an event associated with determining that the amount of change satisfies a threshold amount of change), and/or other types of events.

In some aspects, a collision may occur at the UE 120 between transmission of the timing misalignment information to the satellite 110 and reception of a downlink transmission from the satellite 110. The collision may occur, for example, due to the satellite 110 being unaware of the timing misalignment between the uplink timeline and the downlink timeline for the UE 120, which may result in the satellite 110 scheduling or configuring overlapping transmissions. The UE 120 may identify the collision based at least in part on determining (e.g., using receive processor 258, transmit processor 264, controller/processor 280, memory 282, determination component 1008 of FIG. 10, and/or the like) an overlap between one or more time-domain resources (e.g., symbols, slots, subframes, and/or the like) in which the timing misalignment information is to be transmitted and one or more time-domain resources in which the downlink transmission is to be received. In some aspects, the UE 120 may identify the collision based at least in part on determining an overlap between one or more time-domain resources in which the timing misalignment information is to be transmitted and one or more guard periods or returning time-domain resources on either side of the one or more time-domain resources in which the downlink transmission is to be received. In some aspects, the UE 120 may identify the collision based at least in part on determining an overlap between one or more time-domain resources in which the downlink transmission is to be received and one or more guard period or returning time-domain resources on either side of the timing misalignment information that is to be transmitted.

In these cases, the UE 120 may determine (e.g., using receive processor 258, transmit processor 264, controller/processor 280, memory 282, determination component 1008, and/or the like) a priority associated with the downlink transmission (e.g., a transmission priority, a quality of service (QoS) priority, a physical channel priority, and/or another type of priority)a priority associated with the uplink transmission in which the timing misalignment information is to be transmitted, and may determine to transmit the timing misalignment information based at least in part on the priority associated with the uplink transmission being greater than the priority associated with the downlink transmission.

In some aspects, the UE 120 may continue to periodically and/or non-periodically (e.g., based at least in part on another event or trigger) determine and transmit timing misalignment information to the satellite 110. For example, the UE 120 may transmit updated timing misalignment information associated with an updated timing misalignment at a particular time interval, based at least in part on detecting a threshold amount of change between the timing misalignment and the updated timing misalignment, and/or the like.

In this way, the UE 120 may determine timing misalignment information for a timing misalignment between an uplink timeline and a downlink timeline for a non-terrestrial cell associated with the satellite 110. The UE 120 may transmit the timing misalignment information to the satellite 110, which enables the satellite 110 to schedule and/or configure communications between the UE 120 and the satellite 110 accordingly. In this way, the satellite 110 may schedule and/or configure communications between the UE 120 and the satellite 110 in a manner that reduces and/or prevents collisions between uplink transmissions and downlink receptions for the UE 120. This may decrease the quantity of downlink communications being dropped or non-receivable at the UE 120, may decrease delays in uplink communications being transmitted to the satellite 110, may decrease retransmissions between the UE 120 and the satellite 110, and/or the like.

As indicated above, FIG. 6 is provided as an example. Other examples may differ from what is described with regard to FIG. 6.

Figure 7:
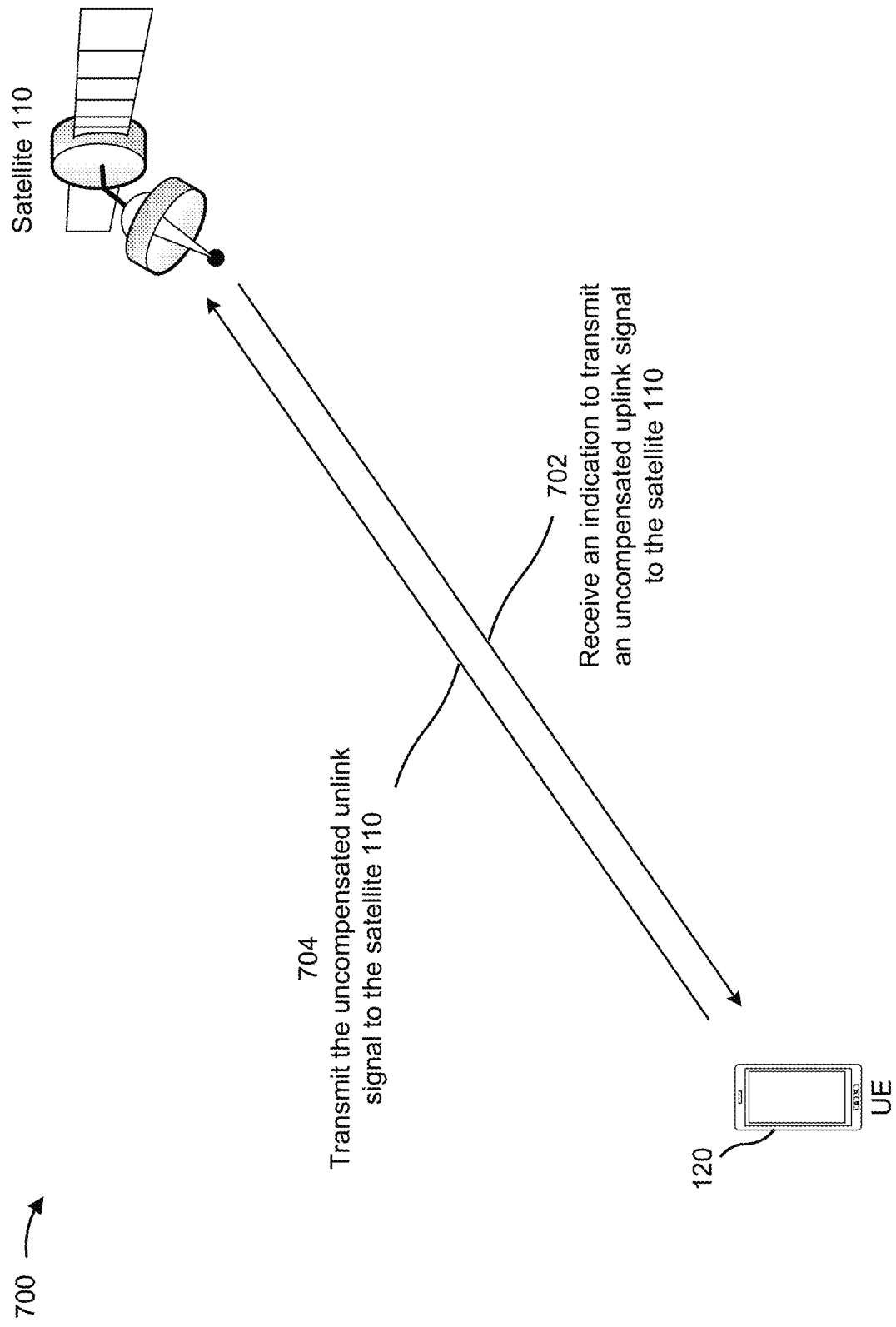

FIG. 7 is a diagram illustrating an example 700 associated with UE timing misalignment reporting in non-terrestrial networks, in accordance with the present disclosure. As shown in FIG. 7, example 700 may include communication between a UE 120 and a satellite 110 (e.g., a satellite 420). In some aspects, the UE 120 and the satellite 110 may be included in a wireless network, such as wireless network 100. In some aspects, the UE 120 and the satellite 110 may communicate on a wireless access link or a service link 430, which may include an uplink 430-U and a downlink 430-D.

In some aspects, UE 120 may be served by a non-terrestrial cell associated with and/or provided by the satellite 110. In some aspects, the UE 120 and the B S 110 may communicate based at least in part on an uplink timeline (e.g., uplink time 512, uplink timeline 522, uplink timeline 532, and/or the like) and a downlink timeline (e.g., downlink timeline 514, downlink timeline 524, downlink timeline 534, and/or the like).

As shown in FIG. 7, and by reference number 702, the UE 120 may receive (e.g., using antenna 252, DEMOD 254, MIMO detector 256, receive processor 258, controller/processor 280, memory 282, reception component 1002, and/or the like) an indication to transmit an uncompensated uplink signal to the satellite 110. In some aspects, the UE 120 may receive the indication in a downlink communication from the satellite 110, such as a DCI communication, a MAC-CE communication, an RRC communication, a PDCCH communication, and/or another type of downlink communication. The uncompensated uplink signal may be an uplink signal that the UE 120 is to transmit without adjustment based at least in part on a timing misalignment (e.g., that is determined by the UE 120) between an uplink timeline and a downlink timeline for the non-terrestrial cell associated with the satellite 110.

As further shown in FIG. 7, and by reference number 704, the UE 120 may transmit (e.g., using antenna 252, transmit processor 264, TX MIMO processor 266, MOD 254, controller/processor 280, memory 282, transmission component 1004, and/or the like) the uncompensated uplink signal to the satellite 110 based at least in part on receiving the indication. In some aspects, the UE 120 may transmit the uncompensated uplink signal as part of a random access channel (RACH) procedure or an initial access procedure. For example, the UE 120 may transmit a RACH preamble transmission on a physical random access channel (PRACH) during the RACH procedure.

In this way, the satellite 110 may receive the uncompensated uplink signal, may measure the uncompensated uplink signal to determine a timing misalignment for the UE 120, and may schedule communications with the UE 120 based at least in part on the timing misalignment.

As indicated above, FIG. 7 is provided as an example. Other examples may differ from what is described with regard to FIG. 7.

Figure 8:
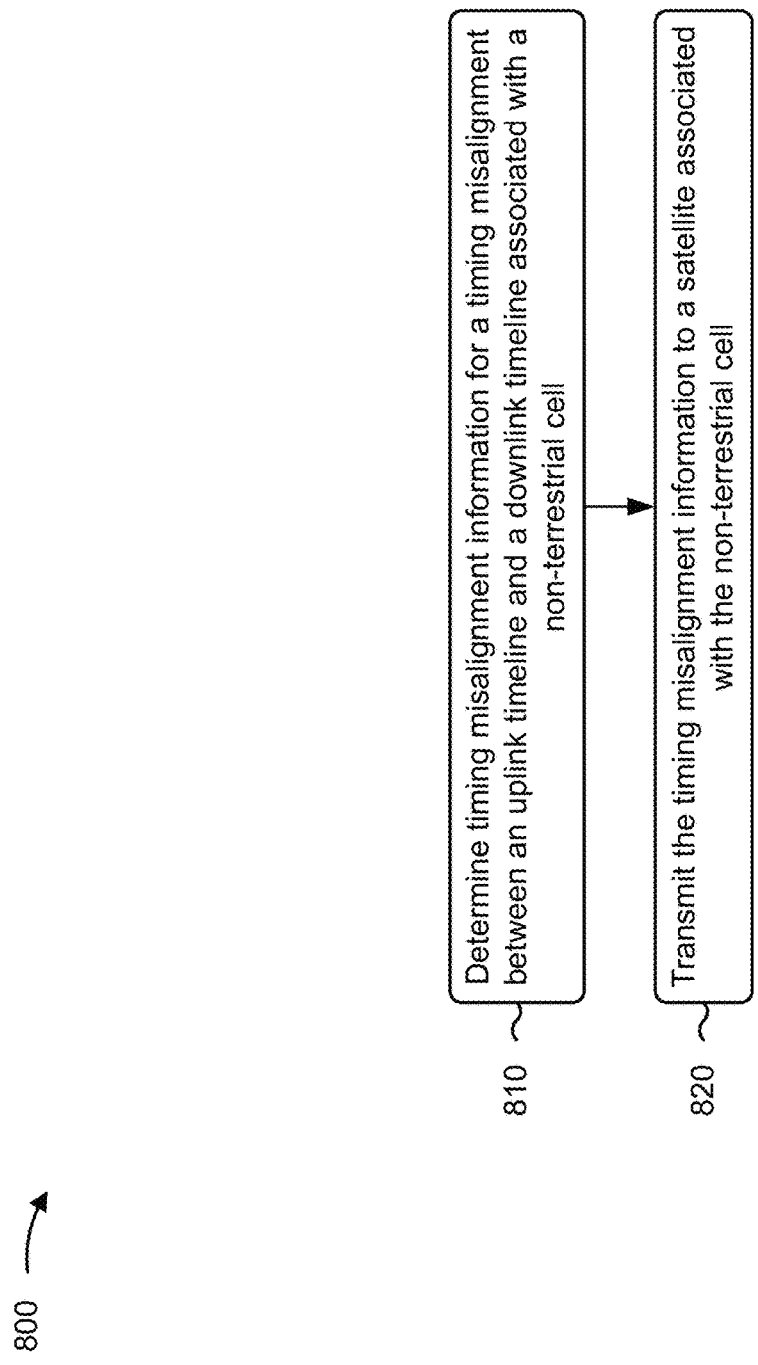
FIGS. 8 and 9 are diagrams illustrating example processes associated with UE timing misalignment reporting in non-terrestrial networks, in accordance with the present disclosure.

FIG. 8 is a diagram illustrating an example process 800 performed, for example, by a UE, in accordance with the present disclosure. Example process 800 is an example where the UE (e.g., UE 120) performs operations associated with UE timing misalignment reporting in non-terrestrial networks.

As shown in FIG. 8, in some aspects, process 800 may include determining timing misalignment information for a timing misalignment between an uplink timeline and a downlink timeline associated with a non-terrestrial cell (block 810). For example, the UE (e.g., using receive processor 258, transmit processor 264, controller/processor 280, memory 282, determination component 1008, and/or the like) may determine timing misalignment information for a timing misalignment between an uplink timeline and a downlink timeline associated with a non-terrestrial cell, as described above.

As further shown in FIG. 8, in some aspects, process 800 may include transmitting the timing misalignment information to a satellite associated with the non-terrestrial cell (block 820). For example, the UE (e.g., using antenna 252, transmit processor 264, TX MIMO processor 266, modulator 254, controller/processor 280, memory 282, transmission component 1004, and/or the like) may transmit the timing misalignment information to a satellite associated with the non-terrestrial cell, as described above.

Process 800 may include additional aspects, such as any single aspect or any combination of aspects described below and/or in connection with one or more other processes described elsewhere herein.

In a first aspect, the timing misalignment information includes at least one of an indication of the timing misalignment, or an indication of a geolocation of the UE. In a second aspect, alone or in combination with the first aspect, the timing misalignment information includes an indication of the timing misalignment, and the indication of the timing misalignment information includes an indication of an offset between the uplink timeline and the downlink timeline. In a third aspect, alone or in combination with one or more of the first and second aspects, the offset is indicated as at least one of a quantity of slots between the uplink timeline and the downlink timeline, a quantity of subframes between the uplink timeline and the downlink timeline, a quantity of radio frames between the uplink timeline and the downlink timeline, or an amount of time between the uplink timeline and the downlink timeline.

In a fourth aspect, alone or in combination with one or more of the first through third aspects, the indication of the offset is provided from among a plurality of candidate offsets configured for the UE. In a fifth aspect, alone or in combination with one or more of the first through fourth aspects, process 800 includes determining (e.g., using receive processor 258, transmit processor 264, controller/processor 280, memory 282, determination component 1008, and/or the like) a measured offset, and selecting, as the offset for the timing misalignment, a candidate offset of the plurality of candidate offsets nearest the measured offset. In a sixth aspect, alone or in combination with one or more of the first through fifth aspects, the offset is indicated as a time duration range from a plurality of time duration ranges or a time-domain resource range from a plurality of time-domain resource ranges.

In a seventh aspect, alone or in combination with one or more of the first through sixth aspects, process 800 includes identifying (e.g., using receive processor 258, transmit processor 264, controller/processor 280, memory 282, and/or the like) a collision between transmission of an uplink transmission in which the timing misalignment information is included and reception of a downlink transmission, and determining (e.g., using receive processor 258, transmit processor 264, controller/processor 280, memory 282, determination component 1008, and/or the like) to transmit the timing misalignment information based at least in part on a priority associated with the uplink transmission being greater than a priority associated with the downlink transmission.

In an eighth aspect, alone or in combination with one or more of the first through seventh aspects, transmitting the timing misalignment information comprises transmitting (e.g., using controller/processor 280, transmit processor 264, TX MIMO processor 266, MOD 254, antenna 252, memory 282, transmission component 1004, and/or the like) the timing misalignment information in at least one of a UCI communication, a MAC-CE communication, or an RRC communication. In a ninth aspect, alone or in combination with one or more of the first through eighth aspects, process 800 includes determining (e.g., using receive processor 258, transmit processor 264, controller/processor 280, memory 282, determination component 1008, and/or the like) updated timing misalignment information for an updated timing misalignment between the uplink timeline and the downlink timeline associated with the satellite, and transmitting (e.g., using controller/processor 280, transmit processor 264, TX MIMO processor 266, MOD 254, antenna 252, memory 282, transmission component 1004, and/or the like) the updated timing misalignment information to the satellite.

In a tenth aspect, alone or in combination with one or more of the first through ninth aspects, transmitting the timing misalignment information comprises transmitting (e.g., using controller/processor 280, transmit processor 264, TX MIMO processor 266, MOD 254, antenna 252, memory 282, transmission component 1004, and/or the like) the timing misalignment information based at least in part on receiving an indication to transmit the timing misalignment information in at least one of a DCI communication, a MAC-CE communication, or an RRC communication. In an eleventh aspect, alone or in combination with one or more of the first through tenth aspects, transmitting the timing misalignment information comprises transmitting (e.g., using controller/processor 280, transmit processor 264, TX MIMO processor 266, MOD 254, antenna 252, memory 282, transmission component 1004, and/or the like) the timing misalignment information on a periodic or semi-persistent uplink grant.

In a twelfth aspect, alone or in combination with one or more of the first through eleventh aspects, transmitting the timing misalignment information comprises transmitting (e.g., using controller/processor 280, transmit processor 264, TX MIMO processor 266, MOD 254, antenna 252, memory 282, transmission component 1004, and/or the like) the timing misalignment information based at least in part on an event, wherein the event comprises at least one of a specification-defined event, or an amount of change between the timing misalignment information and previous timing misalignment information satisfying a threshold. In a thirteenth aspect, alone or in combination with one or more of the first through twelfth aspects, the UE and the satellite communicate using NB-IoT communications and/or eMBB communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
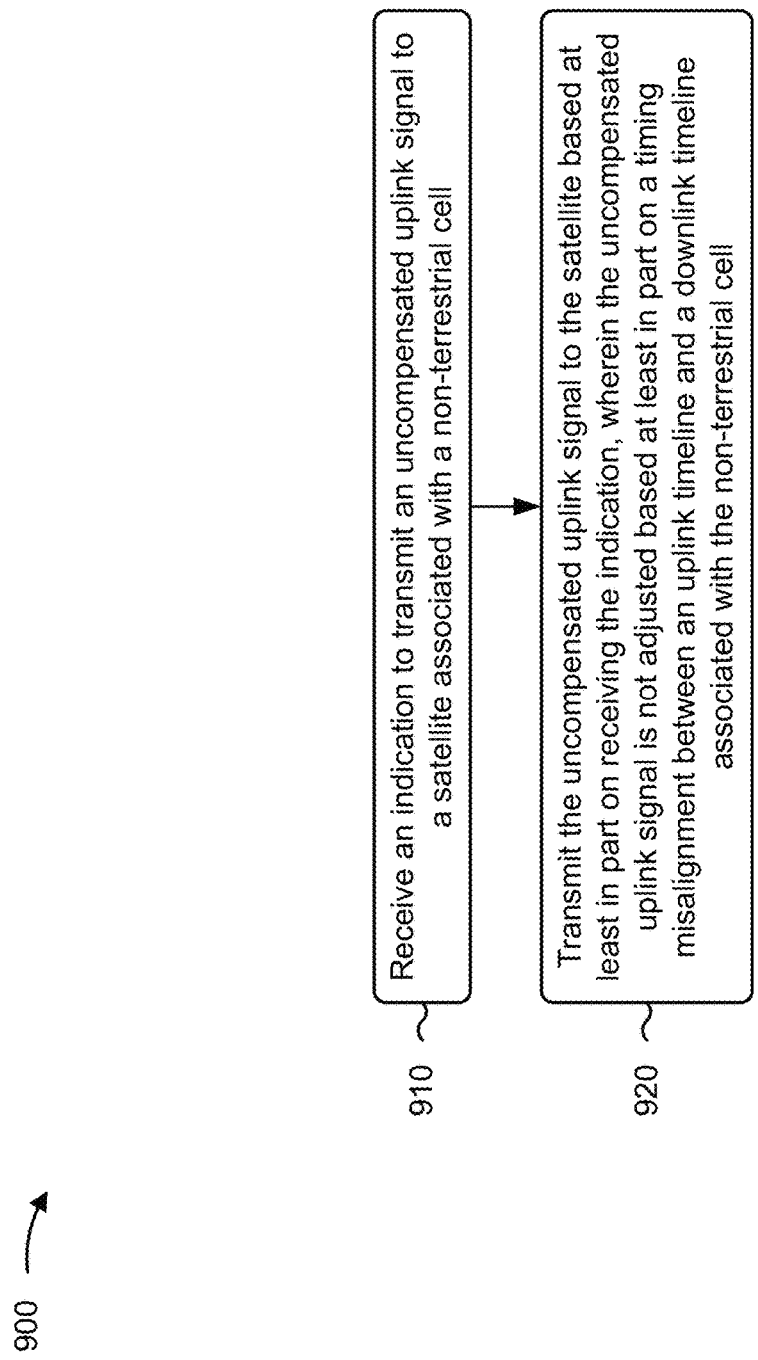

FIG. 9 is a diagram illustrating an example process 900, performed, for example, by a UE, in accordance with the present disclosure. Example process 900 is an example where the UE (e.g., UE 120) performs operations associated with UE timing misalignment reporting in non-terrestrial networks.

As shown in FIG. 9, in some aspects, process 900 may include receiving an indication to transmit an uncompensated uplink signal to a satellite associated with a non-terrestrial cell (block 910). For example, the UE (e.g., using antenna 252, DEMOD 254, MIMO detector 256, receive processor 258, controller/processor 280, memory 282, reception component 1002, and/or the like) may receive an indication to transmit an uncompensated uplink signal to a satellite associated with a non-terrestrial cell, as described above.

As further shown in FIG. 9, in some aspects, process 900 may include transmitting the uncompensated uplink signal to the satellite based at least in part on receiving the indication, wherein the uncompensated uplink signal is not adjusted based at least in part on a timing misalignment between an uplink timeline and a downlink timeline associated with the non-terrestrial cell (block 920). For example, the UE (e.g., using transmit processor 264, TX MIMO processor 266, MOD 254, antenna 252, controller/processor 280, memory 282, transmission component 1004, and/or the like) may transmit the uncompensated uplink signal to the satellite based at least in part on receiving the indication, as described above. In some aspects, the uncompensated uplink signal is not adjusted based at least in part on a timing misalignment between an uplink timeline and a downlink timeline associated with the non-terrestrial cell.

Process 900 may include additional aspects, such as any single aspect or any combination of aspects described below and/or in connection with one or more other processes described elsewhere herein.

In a first aspect, receiving the indication comprises receiving (e.g., using antenna 252, DEMOD 254, MIMO detector 256, receive processor 258, controller/processor 280, memory 282, reception component 1002, and/or the like) the indication in a PDCCH communication. In a second aspect, alone or in combination with the first aspect, transmitting the uncompensated uplink signal comprises transmitting (e.g., using controller/processor 280, transmit processor 264, TX MIMO processor 266, MOD 254, antenna 252, memory 282, transmission component 1004, and/or the like) the uncompensated uplink signal as part of a random access channel (RACH) procedure. In a third aspect, alone or in combination with one or more of the first and second aspects, the uncompensated uplink signal comprises a random access channel preamble transmission on a PRACH. In a fourth aspect, alone or in combination with one or more of the first through third aspects, the UE and the satellite communicate using NB-IoT communications and/or eMBB communications.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a block diagram of an example apparatus 1000 for wireless communication. The apparatus 1000 may be a UE (e.g., UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE 120, a base station 110, a satellite 110, a satellite 420, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIGS. 6 and/or 7. Additionally or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas 252, a DEMOD 254, a MIMO detector 256, a receive processor 258, a controller/processor 280, a memory 282, or a combination thereof, of the UE 120 described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas 252, a MOD 254, a transmit processor 264, a TX MIMO processor 266, a controller/processor 280, a memory 282, or a combination thereof, of the UE 120 described above in connection with FIG. 2. In some aspects, the transmission component 1004 may be co-located with the reception component 1002 in a transceiver.

In some aspects, the determination component 1008 determines timing misalignment information for a timing misalignment between an uplink timeline and a downlink timeline associated with a non-terrestrial cell. In some aspects, the transmission component 1004 may transmit the timing misalignment information to the apparatus 1006 associated with the non-terrestrial cell. In some aspects, the reception component 1002 may receive an indication to transmit an uncompensated uplink signal to the apparatus 1006 associated with a non-terrestrial cell. In some aspects, the transmission component 1004 may transmit the uncompensated uplink signal to the apparatus 1006 based at least in part on receiving the indication.

The determination component 1008 may include a memory. In some aspects, the determination component 1008 may include a receive processor 258, a transmit processor 264, a controller/processor 280, a memory 282, or a combination thereof, of the UE 120 described above in connection with FIG. 2. The determination component 1008 may include one or more instructions that, when executed by one or more processors of an UE, cause the UE to determine timing misalignment information for a timing misalignment between an uplink timeline and a downlink timeline associated with a non-terrestrial cell. The determination component 1008 may include means for determining timing misalignment information for a timing misalignment between an uplink timeline and a downlink timeline associated with a non-terrestrial cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: determining timing misalignment information for a timing misalignment between an uplink timeline and a downlink timeline associated with a non-terrestrial cell; and transmitting the timing misalignment information to a satellite associated with the non-terrestrial cell.

Aspect 2: The method of Aspect 1, wherein the timing misalignment information includes at least one of: an indication of the timing misalignment, or an indication of a geolocation of the UE. Aspect 3: The method of Aspect 1 or 2, wherein the timing misalignment information includes an indication of the timing misalignment; and wherein the indication of the timing misalignment information includes an indication of an offset between the uplink timeline and the downlink timeline.

Aspect 4: The method of Aspect 3, wherein the offset is indicated as at least one of: a quantity of slots between the uplink timeline and the downlink timeline, a quantity of subframes between the uplink timeline and the downlink timeline, a quantity of radio frames between the uplink timeline and the downlink timeline, or an amount of time between the uplink timeline and the downlink timeline. Aspect 5: The method of Aspect 3 or 4, wherein the indication of the offset is provided from among a plurality of candidate offsets configured for the UE.

Aspect 6: The method of Aspect 5, further comprising: determining a measured offset; and selecting, as the offset for the timing misalignment, a candidate offset of the plurality of candidate offsets nearest the measured offset.

Aspect 7: The method of any of Aspects 3-6, wherein the offset is indicated as a time duration range from a plurality of time duration ranges or as a time-domain resource range from a plurality of time-domain resource ranges. Aspect 8: The method of any of Aspects 1-7, further comprising: identifying a collision between transmission of an uplink transmission in which the timing misalignment information is included and reception of a downlink transmission; and determining to transmit the timing misalignment information based at least in part on a priority associated with the uplink transmission being greater than a priority associated with the downlink transmission.

Aspect 9: The method of any of Aspects 1-8, wherein transmitting the timing misalignment information comprises: transmitting the timing misalignment information in at least one of: an uplink control information (UCI) communication, a medium access control control element (MAC-CE) communication, or a radio resource control (RRC) communication. Aspect 10: The method of any of Aspects 1-9, further comprising: determining updated timing misalignment information for an updated timing misalignment between the uplink timeline and the downlink timeline associated with the satellite; and transmitting the updated timing misalignment information to the satellite.

Aspect 11: The method of any of Aspects 1-10, wherein transmitting the timing misalignment information comprises: transmitting the timing misalignment information based at least in part on receiving an indication to transmit the timing misalignment information in at least one of: a downlink control information (DCI) communication, a medium access control control element (MAC-CE) communication, or a radio resource control (RRC) communication. Aspect 12: The method of any of Aspects 1-11, wherein transmitting the timing misalignment information comprises: transmitting the timing misalignment information on a periodic or semi-persistent uplink grant.

Aspect 13: The method of any of Aspects 1-12, wherein transmitting the timing misalignment information comprises: transmitting the timing misalignment information based at least in part on an event, wherein the event comprises at least one of: a specification-defined event, or an amount of change between the timing misalignment information and previous timing misalignment information satisfying a threshold.

Aspect 14: A method of wireless communication performed by a user equipment (UE), comprising: receiving an indication to transmit an uncompensated uplink signal to a satellite associated with a non-terrestrial cell; and transmitting the uncompensated uplink signal to the satellite based at least in part on receiving the indication, wherein the uncompensated uplink signal is not adjusted based at least in part on a timing misalignment between an uplink timeline and a downlink timeline associated with the non-terrestrial cell.

Aspect 15: The method of Aspect 14, wherein receiving the indication comprises: receiving the indication in a physical downlink control channel (PDCCH) communication. Aspect 16: The method of Aspect 14 or 15, wherein transmitting the uncompensated uplink signal comprises: transmitting the uncompensated uplink signal as part of a random access channel (RACH) procedure.

Aspect 17: The method of Aspect 16, wherein the uncompensated uplink signal comprises a RACH preamble transmission on a physical random access channel (PRACH). Aspect 18: The method of any of Aspects 14-18, wherein the UE and the satellite communicate using narrowband Internet of things (NB-IoT) communications and/or enhanced mobile broadband (eMBB) communications.

Aspect 19: An apparatus for wireless communication at a device, comprising a processor; memory coupled with the processor; and instructions stored in the memory and executable by the processor to cause the apparatus to perform the method of one or more of Aspects 1-13. Aspect 20: A device for wireless communication, comprising a memory and one or more processors coupled to the memory, the one or more processors configured to perform the method of one or more of Aspects 1-13. Aspect 21: An apparatus for wireless communication, comprising at least one means for performing the method of one or more of Aspects 1-13.

Aspect 22: A non-transitory computer-readable medium storing code for wireless communication, the code comprising instructions executable by a processor to perform the method of one or more of Aspects 1-13. Aspect 23: A non-transitory computer-readable medium storing a set of instructions for wireless communication, the set of instructions comprising one or more instructions that, when executed by one or more processors of a device, cause the device to perform the method of one or more of Aspects 1-13.

Aspect 24: An apparatus for wireless communication at a device, comprising a processor; memory coupled with the processor; and instructions stored in the memory and executable by the processor to cause the apparatus to perform the method of one or more of Aspects 14-18. Aspect 25: A device for wireless communication, comprising a memory and one or more processors coupled to the memory, the one or more processors configured to perform the method of one or more of Aspects 14-18. Aspect 26: An apparatus for wireless communication, comprising at least one means for performing the method of one or more of Aspects 14-18.

Aspect 27: A non-transitory computer-readable medium storing code for wireless communication, the code comprising instructions executable by a processor to perform the method of one or more of Aspects 14-18. Aspect 28: A non-transitory computer-readable medium storing a set of instructions for wireless communication, the set of instructions comprising one or more instructions that, when executed by one or more processors of a device, cause the device to perform the method of one or more of Aspects 14-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
one or more memories comprising instructions; and
one or more processors configured to execute the instructions to cause the apparatus to:
   determine a timing misalignment between an uplink timeline and a downlink timeline associated with a non-terrestrial cell; and
   output, for transmission to a network entity associated with the non-terrestrial cell via a medium access control (MAC) control element (MAC-CE), information about the timing misalignment, the output being based at least in part on an event that comprises an amount of change between the information about the timing misalignment and previous information about the timing misalignment satisfying a threshold.

2. The apparatus of claim 1, wherein the information about the timing misalignment includes at least one of:
an indication of the timing misalignment, or
an indication of a geolocation of the apparatus.

3. The apparatus of claim 1, wherein the information about the timing misalignment includes an indication of the timing misalignment; and
wherein the indication of the timing misalignment includes an indication of an offset between the uplink timeline and the downlink timeline.

4. The apparatus of claim 3, wherein the offset is indicated as at least one of:
a quantity of slots between the uplink timeline and the downlink timeline,
a quantity of subframes between the uplink timeline and the downlink timeline,
a quantity of radio frames between the uplink timeline and the downlink timeline, or
an amount of time between the uplink timeline and the downlink timeline.

5. The apparatus of claim 3, wherein the indication of the offset identifies the offset from among a plurality of candidate offsets configured for the apparatus.

6. The apparatus of claim 5, wherein the one or more processors are further configured to execute the instructions and to cause the apparatus to:
determine a measured offset; and
select, as the offset for the timing misalignment, a candidate offset of the plurality of candidate offsets nearest the measured offset.

7. The apparatus of claim 3, wherein the offset is indicated as a time duration range or as a time-domain resource range.

8. The apparatus of claim 1, wherein the one or more processors are further configured to execute the instructions to cause the apparatus to:
identify a collision between an uplink transmission in which the information about the timing misalignment is included and reception of a downlink transmission, the information about the timing misalignment being output for transmission based at least in part on a priority associated with the uplink transmission being greater than a priority associated with the downlink transmission.

9. The apparatus of claim 1, wherein the one or more processors are further configured to execute the instructions and to cause the apparatus to:
determine an updated timing misalignment between the uplink timeline and the downlink timeline associated with the network entity; and
output, for transmission, information about the updated timing misalignment to the network entity.

10. The apparatus of claim 1, wherein the one or more processors, to output the information about the timing misalignment, are configured to execute the instructions to cause the apparatus to:
output, for transmission, the information about the timing misalignment on a periodic or semi-persistent uplink grant.

11. The apparatus of claim 1, wherein
the event further comprises:
a specification-defined event.

12. A user equipment (UE), comprising:
a transceiver;
one or more memories comprising instructions; and
one or more processors configured to execute the instructions to cause the UE to:
   determine a timing misalignment between an uplink timeline and a downlink timeline associated with a non-terrestrial cell; and
   transmit, via the transceiver, to a network entity associated with the non-terrestrial cell and via a medium access control (MAC) control element (MAC-CE), information about the timing misalignment, the transmission being based at least in part on an event that comprises an amount of change between the information about the timing misalignment and previous information about the timing misalignment satisfying a threshold.

13. The UE of claim 12, wherein the information about the timing misalignment includes at least one of:
an indication of the timing misalignment, or
an indication of a geolocation of the UE.

14. The UE of claim 12, wherein the information about the timing misalignment includes an indication of the timing misalignment; and
wherein the indication of the timing misalignment includes an indication of an offset between the uplink timeline and the downlink timeline.

15. The UE of claim 14, wherein the offset is indicated as at least one of:
a quantity of slots between the uplink timeline and the downlink timeline,
a quantity of subframes between the uplink timeline and the downlink timeline,
a quantity of radio frames between the uplink timeline and the downlink timeline, or
an amount of time between the uplink timeline and the downlink timeline.

16. The UE of claim 14, wherein the indication of the offset is provided from among a plurality of candidate offsets configured for the UE.

17. The UE of claim 16, wherein the one or more processors are further configured to execute the instructions to cause the UE to:
determine a measured offset; and select, as the offset for the timing misalignment, a candidate offset of the plurality of candidate offsets nearest the measured offset.

18. An apparatus for wireless communication, comprising:
one or more memories comprising instructions; and
one or more processors configured to execute the instructions and cause the apparatus to:
determine a timing misalignment between an uplink timeline and a downlink timeline associated with a non-terrestrial cell;
output, for transmission to a network entity associated with the non-terrestrial cell via a medium access control (MAC) control element (MAC-CE), information about the timing misalignment; and
identify a collision between an uplink transmission in which the information about the timing misalignment is included and reception of a downlink transmission, the information about the timing misalignment being output for transmission based at least in part on a priority associated with the uplink transmission being greater than a priority associated with the downlink transmission.

19. The apparatus of claim 18, further comprising a transceiver configured to transmit the information about the timing misalignment, wherein the apparatus is configured as a user equipment.

20. A user equipment (UE), comprising:
a transceiver;
one or more memories comprising instructions; and
one or more processors configured to execute the instructions to cause the apparatus to:
determine a timing misalignment between an uplink timeline and a downlink timeline associated with a non-terrestrial cell; and
transmit, via the transceiver and to a network entity associated with the non-terrestrial cell, information about the timing misalignment, wherein the information is transmitted via a medium access control (MAC) control element (MAC-CE).

21. The UE of claim 20, wherein the information about the timing misalignment includes at least one of:
an indication of the timing misalignment, or
an indication of a geolocation of the apparatus.

22. The UE of claim 20, wherein the information about the timing misalignment includes an indication of the timing misalignment; and
wherein the indication of the timing misalignment includes an indication of an offset between the uplink timeline and the downlink timeline.

23. The UE of claim 22, wherein the offset is indicated as at least one of:
a quantity of slots between the uplink timeline and the downlink timeline,
a quantity of subframes between the uplink timeline and the downlink timeline,
a quantity of radio frames between the uplink timeline and the downlink timeline, or
an amount of time between the uplink timeline and the downlink timeline.

24. The UE of claim 22, wherein the indication of the offset identifies the offset from among a plurality of candidate offsets configured for the apparatus.

25. The UE of claim 24, wherein the one or more processors are further configured to execute the instructions and cause the apparatus to:
determine a measured offset; and
select, as the offset for the timing misalignment, a candidate offset of the plurality of candidate offsets nearest the measured offset.

26. The UE of claim 22, wherein the offset is indicated as a time duration range or as a time-domain resource range.

27. The UE of claim 20, wherein the one or more processors are further configured to execute the instructions and cause the apparatus to:
identify a collision between an uplink transmission in which the information about the timing misalignment is included and reception of a downlink transmission, the information about the timing misalignment being output for transmission based at least in part on a priority associated with the uplink transmission being greater than a priority associated with the downlink transmission.

28. The UE of claim 20, wherein the one or more processors are further configured to execute the instructions and cause the apparatus to:
determine an updated timing misalignment between the uplink timeline and the downlink timeline associated with the network entity; and
output, for transmission, information about the updated timing misalignment to the network entity.

29. The UE of claim 20, wherein the one or more processors, to output the information about the timing misalignment, are configured to execute the instructions and cause the apparatus to:
output, for transmission, the information about the timing misalignment on a periodic or semi-persistent uplink grant.

30. The UE of claim 20, wherein the one or more processors, to output the information about the timing misalignment, are configured to execute the instructions and cause the apparatus to:
output, for transmission the information about the timing misalignment based at least in part on an event,
wherein the event comprises at least one of:
a specification-defined event, or
an amount of change between the information about the timing misalignment and previous information about the timing misalignment satisfying a threshold.

* * * * *